United States Patent
Borthakur et al.

(10) Patent No.: US 7,415,480 B2
(45) Date of Patent: Aug. 19, 2008

(54) SYSTEM AND METHOD FOR PROVIDING PROGRAMMING-LANGUAGE-INDEPENDENT ACCESS TO FILE SYSTEM CONTENT

(75) Inventors: Dhrubajyoti Borthakur, San Jose, CA (US); Nur Premo, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 499 days.

(21) Appl. No.: 10/732,727

(22) Filed: Dec. 10, 2003

(65) Prior Publication Data

US 2005/0131955 A1    Jun. 16, 2005

(51) Int. Cl.
G06F 17/30    (2006.01)

(52) U.S. Cl. ............... 707/102; 707/10; 707/205

(58) Field of Classification Search ............ 707/1–10, 707/100–104.1, 200–206; 713/194; 370/338; 711/172; 717/148; 718/1
See application file for complete search history.

(56) References Cited

U.S. PATENT DOCUMENTS

| | | | |
|---|---|---|---|
| 5,623,657 A | 4/1997 | Conner | |
| 6,240,401 B1 | 5/2001 | Oren et al. | |
| 6,240,429 B1 | 5/2001 | Thornton et al. | |
| 6,286,013 B1 | 9/2001 | Reynolds et al. | |
| 6,389,538 B1 | 5/2002 | Gruse et al. | |
| 6,799,184 B2 | 9/2004 | Bhatt | |
| 6,842,758 B1 | 1/2005 | Bogrett | |
| 6,976,241 B2 | 12/2005 | Cruz | |
| 7,350,200 B2 * | 3/2008 | Lueh et al. | 717/148 |
| 2001/0025311 A1 | 9/2001 | Arai et al. | |
| 2002/0049731 A1 | 4/2002 | Kotani | |
| 2002/0184608 A1 * | 12/2002 | Pabla | 717/106 |
| 2003/0093556 A1 | 5/2003 | Yeung et al. | |
| 2003/0151633 A1 | 8/2003 | George et al. | |
| 2003/0172368 A1 | 9/2003 | Alumbaugh et al. | |
| 2004/0002942 A1 | 1/2004 | Pudipeddi et al. | |
| 2004/0015862 A1 * | 1/2004 | Dunn | 717/124 |
| 2004/0059866 A1 | 3/2004 | Patel et al. | |
| 2004/0068480 A1 * | 4/2004 | Lam et al. | 707/1 |
| 2004/0078542 A1 * | 4/2004 | Fuller et al. | 711/172 |
| 2004/0186857 A1 | 9/2004 | Serlet | |
| 2005/0015461 A1 | 1/2005 | Richard et al. | |
| 2005/0038813 A1 | 2/2005 | Apparao et al. | |

(Continued)

OTHER PUBLICATIONS

"The Business Rationale for Distributed (Remote) Document Capture," Verity White Paper, Oct. 2003, downloaded from http://www.cardiff.com/cms/groups/public/documents/collateral/mk0535.pdf, 12 pages.

(Continued)

Primary Examiner—Diane Mizrahi
(74) Attorney, Agent, or Firm—Meyertons Hood Kivlin Kowert & Goetzel, P.C.; B. Noël Kivlin; Anthony M. Petro

(57) ABSTRACT

A system and method for providing programming-language-independent access to file system content. In one embodiment, the system may include a storage device configured to store a plurality of files and a file system configured to manage access to the storage device and to store file system content. The file system may include a programming-language-independent interface whereby an application accesses the file system content.

18 Claims, 4 Drawing Sheets

U.S. PATENT DOCUMENTS

| | | | |
|---|---|---|---|
| 2005/0060561 A1* | 3/2005 | Pearson et al. | 713/194 |
| 2005/0073982 A1* | 4/2005 | Corneille et al. | 370/338 |
| 2005/0114363 A1 | 5/2005 | Borthakur et al. | |
| 2005/0114381 A1 | 5/2005 | Borthakur et al. | |
| 2005/0114406 A1* | 5/2005 | Borthakur et al. | 707/200 |
| 2006/0004709 A1 | 1/2006 | Borthakur | |
| 2006/0004759 A1 | 1/2006 | Borthakur et al. | |

OTHER PUBLICATIONS

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/april03/staples/04staples.html, 12 pages.

Wildermuth, "A Developer's Perspective on WinFS: Part 1," Mar. 2004, downloaded from http://web.archive.org/web/20050414063209/http://msdn.microsoft.com/data/winfs/default.aspx?pull=/library/en-us/dnwinfsta/html/winfsdevpersp.asp, 10 pages.

* cited by examiner

SYSTEM AND METHOD FOR PROVIDING PROGRAMMING-LANGUAGE-INDEPENDENT ACCESS TO FILE SYSTEM CONTENT

BACKGROUND OF THE INVENTION

1. Field of the Invention

This invention relates to computer systems and, more particularly, to file-based storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

In some file-based computer systems, various types of information about files, also referred to as metadata, may be stored in addition to the files themselves. However, in typical conventional computer systems, access to files and their metadata by application software is provided by an interface specific to a particular programming language, operating system, or hardware architecture. In such systems, for applications using a new programming language, operating system, or hardware architecture to be given access to files and metadata, a separate interface may need to be provided.

Creating and supporting new interfaces may require additional programmer effort, such as coding and verification effort. Further, as types of interfaces multiply, the effort required to maintain them over time increases. Additionally, if a unique interface is provided for each programming language, operating system, or architecture scenario, such interfaces may diverge considerably in their support for various features of file and metadata access. For example, not all interfaces may provide all programming languages the same level of access to file data and metadata. Such divergence among interfaces may complicate the application programming task and hinder acceptance of a given file format among developers.

SUMMARY OF THE INVENTION

Various embodiments of a system and method for providing programming-language-independent access to file system content are disclosed. In one embodiment, the system may include a storage device configured to store a plurality of files and a file system configured to manage access to the storage device and to store file system content. The file system may include a programming-language-independent interface whereby an application accesses the file system content.

In one specific implementation of the system, the programming-language-independent interface may be configured to detect a virtual file identity corresponding to a given file, select at least a portion of the file system content dependent on the virtual file identity, and return the selected file system content. In one embodiment of this implementation, the virtual file identity may be formed by embedding a command token within a file identity corresponding to the given file, while in another embodiment of this implementation, the virtual file identity may be formed by prepending a virtual directory to a file identity corresponding to the given file.

A method is also contemplated which, in one embodiment, may include storing file system content and accessing the file system content via a programming-language-independent interface.

Figure 1:
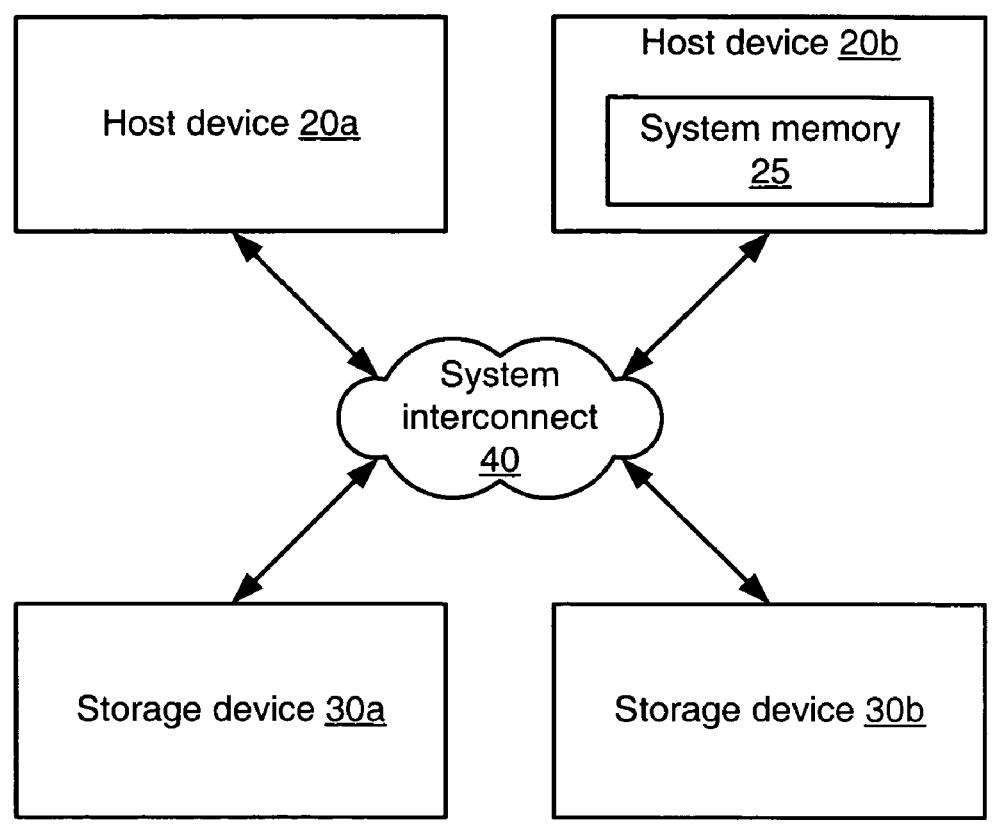
FIG. 1 is a block diagram illustrating one embodiment of a storage system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Storage System and File System Overview

Turning now to FIG. 1, a block diagram of one embodiment of a storage system is shown. In the illustrated embodiment, storage system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of storage system 10, host devices 20 may be configured to access data stored on one or more of storage devices 30. In one embodiment, storage system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of storage system 10 implemented within a single computer system, storage system 10 may be configured to provide most of the data storage requirements for one or more other computer systems (not shown), and may be configured to communicate with such other computer systems. In an alternative embodiment, storage system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of storage system 10 may facilitate scaling of storage system capacity as well as data bandwidth between host and storage devices.

In still another embodiment, storage system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that storage system 10 may have an arbitrary number of each of these types of devices in alternative embodiments. Also, in some embodiments of storage system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of storage system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in storage system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of storage system 10 as system memory 25. Further, a computer-accessible medium may include transmission media or signals such as electrical, electromagnetic, or digital signals, conveyed via a communication medium such as network and/or a wireless link, which may be included in some embodiments of storage system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix operating system, the Apple Macintosh operating system, or another suitable operating system. Additionally, a given host device may be configured to execute application programs such as word processors, web browsers and/or servers, email clients and/or servers, and multimedia applications, among many other possible applications.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored.

Many operating system embodiments provide data and control structures for organizing the storage space provided by storage devices 30 into files. In various embodiments, the data structures may include one or more tables configured to store information such as, for example, the identity of each file, its location within storage devices 30 (e.g., a mapping to a particular physical location within a particular storage device), as well as other information about each file as described in greater detail below. Also, in various embodiments, the control structures may include executable routines for manipulating files, such as, for example, function calls for changing file identity and for modifying file content as described in greater detail below. Collectively, these data and control structures may be referred to herein as a file system, and the particular data formats and protocols implemented by a given file system may be referred to herein as the format of the file system.

In some embodiments, a file system may be integrated into the operating system such that any access to data stored on storage devices 30 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 2.

Figure 2:
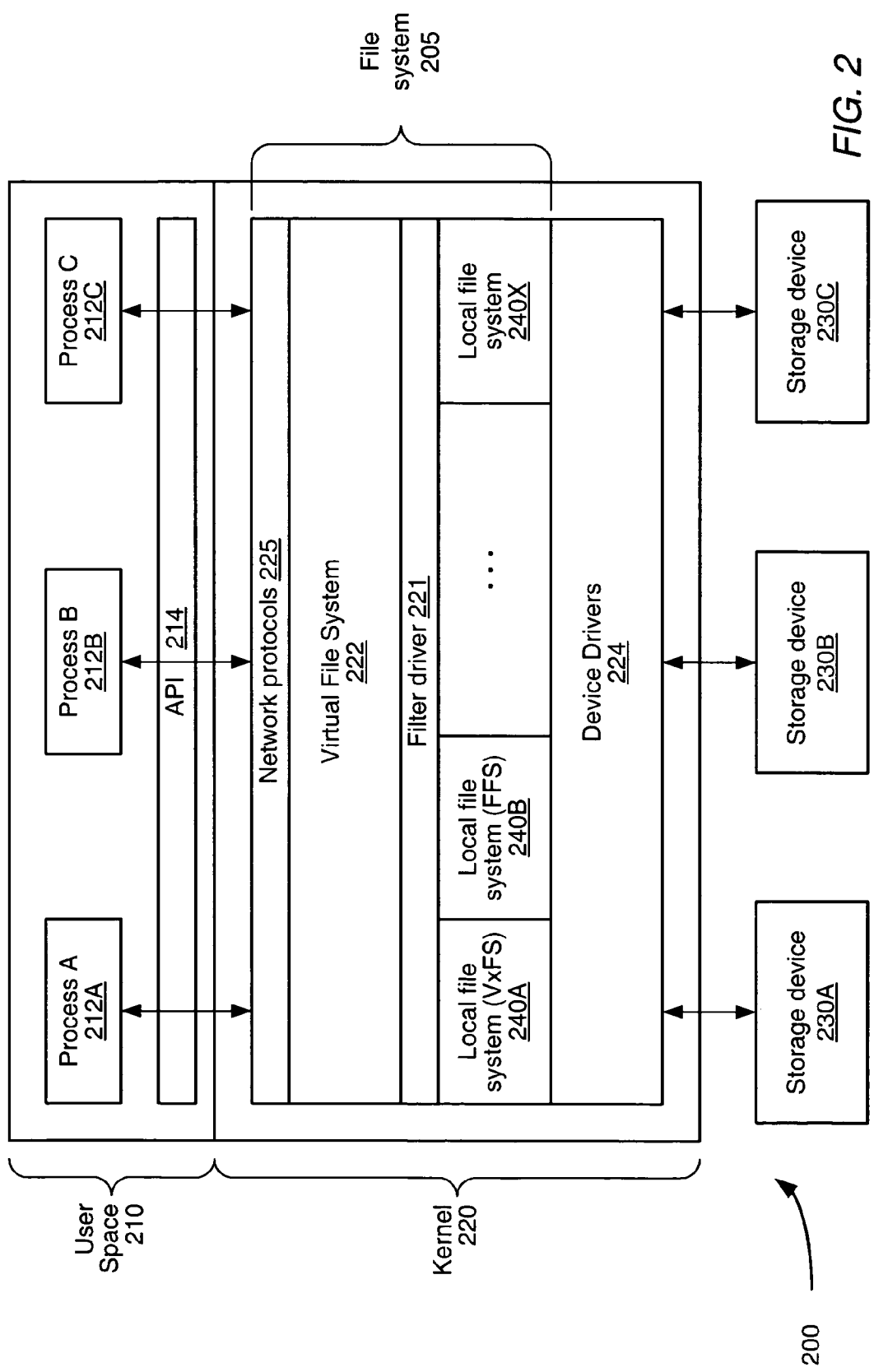
FIG. 2 is a block diagram illustrating one embodiment of an operating system architecture and its interface to storage devices.

FIG. 2 illustrates one embodiment of an operating system architecture and its interface to storage devices. In the illustrated embodiment, operating system 200 includes a user space 210 and a kernel space 220. User space 210 includes a plurality of processes 212A-C, each of which may correspond to a given user application. In some embodiments, some application processes 212 within user space 210 may be distinct from operating system 200. Such processes may be said to operate within an environment provided by operating system 200, or to operate "on top of" operating system 200. Each of processes 212 may be configured to access storage devices 230A-C through calls to application programming interface (API) 214. API 214 provides processes 212 with access to file system 205, which is configured to operate within kernel space 220. In one embodiment, storage devices 230 may be illustrative of storage devices 30 of FIG. 1. Also, in one embodiment, operating system 200, any of its components, and/or any of processes 212 may be configured to execute on one or more host devices 20 of FIG. 1, for example as program instructions and data stored within a computer-accessible medium such as system memory 25 of FIG. 1.

As described above with respect to storage system 10 of FIG. 1, a given host device 20 may reside in a different computer system from a given storage device 30, and may access that storage device via a network. Likewise, with respect to operating system 200, in one embodiment a given process such as process 212A may execute remotely and may access storage devices 230 over a network. In the illustrated embodiment, file system 200 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 212 to a format applicable to the particular local file system 240 targeted by each operation. Additionally, in the illustrated embodiment operating system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

It is noted that filter driver 221 is part of file system 205 and not an application or process within user space 210. Consequently, filter driver 221 may be configured to operate independent of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 212. In such embodiments, processes executing in kernel space 220 maybe configured to access file system 205 through a kernel-mode API (not shown), in a manner similar to user space processes 212. Thus, in some embodiments, all accesses to storage devices 230 may be processed by file system 205, regardless of the type or space of the process originating the access operation.

Numerous alternative embodiments of operating system 200 and file system 205 are possible and contemplated. For example, file system 205 may support different numbers and formats of local file systems 240, or only a single local file system 240. In some embodiments, network protocol 225 may be omitted or integrated into a portion of operating system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Files and Metadata

As described above, file system 205 may be configured to manage access to a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". However, in embodiments of file system 205 that implement a file hierarchy, such as a hierarchy of folders or directories, all or part of the file hierarchy may be included in the file identity. For example, a given file named "file1.txt" may reside in a directory "smith" that in turn resides in a directory "users". The directory "users" may reside in a directory "test1" that is a top-level or root-level directory within file system 205. In some embodiments, file system 205 may define a single "root directory" to include all root-level directories, where no higher-level directory includes the root directory. In other embodiments, multiple top-level directories may coexist such that no higher-level directory includes any top-level directory. The names of the specific folders or directories in which a given file is located may be referred to herein as the given file's path or path name.

In some embodiments of file system 205 that implement a file hierarchy, a given file's identity may be specified by listing each directory in the path of the file as well as the file name. Referring to the example given above, the identity of the given instance of the file named "file1.txt" may be specified as "/test1/users/smith/file1.txt". It is noted that in some embodiments of file system 205, a file name alone may be insufficient to uniquely identify a given file, whereas a fully specified file identity including path information may be sufficient to uniquely identify a given file. There may, for example, exist a file identified as "/test2/users/smith/file1.txt" that, despite sharing the same file name as the previously mentioned file, is distinct by virtue of its path. It is noted that other methods of representing a given file identity using path and file name information are possible and contemplated. For example, different characters may be used to delimit directory/folder names and file names, or the directory/folder names and file names may be specified in a different order.

The files managed by file system 205 may store application data or program information, which may collectively be referred to as file data, in any of a number of encoding formats. For example, a given file may store plain text in an ASCII-encoded format or data in a proprietary application format, such as a particular word processor or spreadsheet encoding format. Additionally, a given file may store video or audio data or executable program instructions in a binary format. It is contemplated that numerous other types of data and encoding formats, as well as combinations of data and encoding formats, may be used in files as file data. In addition to managing access to storage devices, the various files stored on storage devices, and the file data in those files as described above, in some embodiments file system 205 may be configured to store information corresponding to one or more given files, which information may be referred to herein as metadata. Generally speaking, metadata may encompass any type of information associated with a file. In various embodiments, metadata may include information such as (but not limited to) the file identity, size, ownership, and file access permissions. Metadata may also include free-form or user-defined data such as records corresponding to file system operations, as described in greater detail below. Metadata corresponding to a file as well as the data content of files may collectively be referred to herein as file system content.

Figure 3:
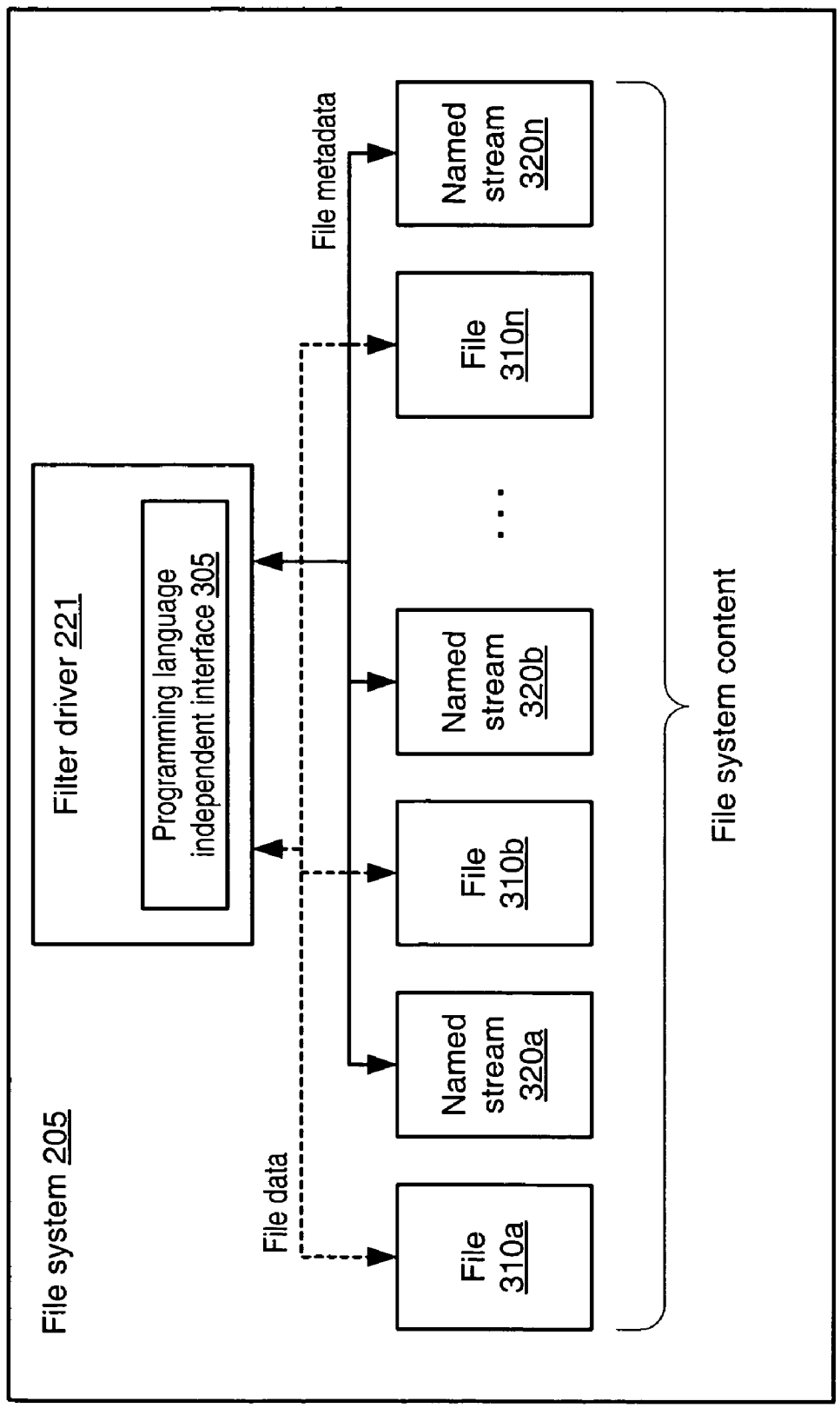
FIG. 3 is a block diagram illustrating one embodiment of a file system configured to store file system content.

FIG. 3 illustrates one embodiment of a file system configured to store file system content. The embodiment of file system 205 shown in FIG. 3 may include those elements illustrated in the embodiment of FIG. 2; however, for sake of clarity, some of these elements are not shown. In the illustrated embodiment, file system 205 includes filter driver 221, an arbitrary number of files 310a-n, and a respective named stream 320a-n associated with each of files 310a-n. Filter driver 221 includes programming language independent interface 305. It is noted that a generic instance of one of files 310a-n or named streams 320a-n may be referred to respectively as a file 310 or a named stream 320, and that files 310a-n and named reams 320a-n may be referred to collectively as files 310 and named streams 320, respectively. As noted above, files 310 and named streams 320 may collectively be referred to as file system content.

Files 310 may be representative of files managed by file system 205, and may in various embodiments be configured to store various types of data and program instructions as described above. In the illustrated embodiment, each of files 310 has a corresponding named stream 320. Each of named streams 320 may be configured to store metadata pertaining to its corresponding file. It is noted that files 310 and named streams 320 may be physically stored on one or more storage devices, such as storage devices 230 of FIG. 2. However, for purposes of illustration, files 310 and named streams 320 are shown as conceptually residing within file system 205.

In some embodiments, filter driver 221 may be configured to access file data stored in a given file 310. For example, filter driver 221 may be configured to detect read and/or write operations received by file system 205, and may responsively cause file data to be read from or written to a given file 310 corresponding to the received operation. In some embodiments, filter driver 221 may be configured to generate metadata corresponding to a given file 310 and store the generated metadata in the corresponding named stream 320. For example, upon detecting a file write operation directed to given file 310, filter driver 221 may be configured to update metadata corresponding to the last modified time of given file 310 and to store the updated metadata within named stream 320. Also, as described in greater detail below, in some embodiments filter driver 221 may be configured to retrieve metadata corresponding to a specified file on behalf of a particular application.

Metadata also may be generated in response to various types of file system activity initiated by operating system 200 or processes 212 of FIG. 2. In some embodiments, the generated metadata may include records of arbitrary complexity. For example, in one embodiment filter driver 221 may be configured to detect various types of file manipulation operations such as file create, delete, rename, and/or copy operations as well as file read and write operations. After detecting a particular file operation, filter driver 221 may be configured to generate a record of the operation and store the record in the appropriate named stream 320 as metadata of the file 310 targeted by the operation.

The stored metadata record may in various embodiments include various kinds of information about the file 310 and the operation detected, such as the identity of the process generating the operation, file identity, file type, file size, file owner, and/or file permissions, for example. In one embodiment, the record may include a file signature indicative of the content of file 310. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. The record may also include additional information not specifically listed.

In one embodiment, the metadata record stored by filter driver 221 subsequent to detecting a particular file operation may be generated and stored in Extensible Markup Language (XML) format, although it is contemplated that in other embodiments, any suitable format may be used. XML-format records may allow arbitrary definition of record fields, according to the desired metadata to be recorded. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>0</size>
</record>
```

Such a record may be appended to the named stream (for example, named stream 320a) associated with the file (for example, file 310a) having the file identity "/test1/foo.pdf" subsequent to, for example, a file create operation. In this case, the number associated with the "record sequence" field indicates that this record is the first record associated with file 310a. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 310a in a format specific to the file system 205 and/or the operating system. The "md5" field records an MD5 signature corresponding to the file contents, and the "size" field records the length of file 310a in bytes. It is contemplated that in alternative embodiments, filter driver 221 may store records corresponding to detected operations where the records include more or fewer fields, as well as fields having different definitions and content. It is also contemplated that in some embodiments filter driver 221 may encapsulate data read from a given file 310 within the XML format, such that read operations to files may return XML data regardless of the underlying file data format. Likewise, in some embodiments filter driver 221 may be configured to receive XML format data to be written to a given file 310. In such an embodiment, filter driver 221 may be configured to remove XML formatting prior to writing the file data to given file 310.

It is noted that in some embodiments, metadata may be stored in a structure other than a named stream. For example, in one embodiment metadata corresponding to one or more files may be stored in another file in a database format or another format. Also, it is contemplated that in some embodiments, other software modules or components of file system 205 may be configured to generate, store, and/or retrieve metadata. For example, the metadata function of filter driver 221 may be incorporated into or duplicated by another software module.

Accessing File System Content

As described above, in some embodiments file system 205 may be configured to store various types of file system content. File system 205 may store numerous types of file data within one or more files, and may store metadata of arbitrary complexity corresponding to a given file. File system 205 may also be configured to consume metadata. For example, file system 205 may implement particular storage policies whereby files having certain usage characteristics as indicated in their metadata are assigned to particular types of storage. In one embodiment, for example, files that are more recently used or are accessed by certain types of processes may be assigned to faster types of storage, whereas other files may be assigned to slower storage.

In some embodiments, application or operating system processes external to file system 205 (such as processes 212 of FIG. 2) may also be configured to access file system content. For example, a programmer writing an application software module may wish to create and manipulate specific files and their associated file data in order to store or retrieve application data. Additionally, such a programmer may wish to perform actions contingent on the metadata characteristics of certain files, such as configuring a backup program to select only files that have been modified since the time of the last backup. In some embodiments, API 214 of FIG. 2 may provide an interface of function calls whereby an application process 212 may interact with file system 205 to interact with file system content.

However, in many embodiments, API 214 consists of language-specific interfaces, such as library or stub files that are written to interface with applications coded in particular languages, such as C or Java, for example. Supporting applications written in languages other than those supported by the existing API 214 may require the coding of an additional API targeted to the desired language. Further, in some embodiments, APIs may reflect specific underlying characteristics of operating systems or hardware architectures, and in some instances where file system 205 supports interfaces to different operating systems or architectures, multiple APIs may be required even for the same target application language. For example, some hardware architectures may use different byte ordering conventions (e.g., "endianness") for data storage, requiring API libraries and/or stub files conforming to each desired byte ordering convention.

Additionally, as previously noted, in some embodiments the metadata stored by file system 205 may be arbitrarily extensible to cover many different types of information. In such embodiments, providing specific support in API 214 for each possible type of arbitrary record that may be stored as metadata (such as by providing unique or explicitly parameterized function calls, for example) may significantly complicate the coding and maintenance of API 214.

In the embodiment illustrated in FIG. 3, filter driver 221 includes programming language independent interface 305, which may also be referred to herein as interface 305. Interface 305 may be configured to provide a protocol whereby a given software application may access file system content, such as file data or metadata corresponding to a given file, independently of the programming language or format of the application or the associated API. Thus, interface 305 may allow any software application capable of accessing a file to access any file data included in or metadata associated with that file, regardless of programming language issues or the specific metadata requested. It is contemplated that that in some embodiments, interface 305 may be implemented externally to filter driver 221 or incorporated into a different module or process of file system 205.

In one embodiment, interface 305 may be configured to examine the various file operations processed by filter driver 221 to detect whether a given operation specifies a virtual file identity, and to select and return corresponding metadata of a given file identity dependent on the virtual file identity. Generally speaking, a virtual file identity may be constructed for any given file identity defined within file system 205 by adding information to the given file identity according to a particular format or protocol. Thus, a virtual file identity may not literally specify a particular file within file system 205, but may instead represent a semantic "overloading" of a file identity that does specify such a particular file.

One embodiment of a format for forming a virtual file identity includes embedding a command token within a given file identity. The command token may include a string of characters that specify a type of file system content to be accessed with respect to the given file identity. In one embodiment, a command token may take the form of the string "$cas:cmd:" inserted into the file identity just prior to the file name, where the cmd field indicates one or more of several possible types of file system content to be accessed. For example, to access the file data stored in a file associated with the file identity "/test1/users/smith/file1.txt", a corresponding virtual file identity may be "/test1/users/smith/$cas:rddata: file1.txt", where "rddata" is defined as a cmd field value that selects all file data stored in the file. In some embodiments, command tokens such as "rddata" may include other arguments, for example, parameters specifying a location at which to begin accessing file data as well as a quantity of data to be accessed. For example, a "rddata(345, 100)" command token may be configured to cause 100 bytes of file data to be read from the specified file, beginning at byte 345 of the file.

As another example, to access the entire contents of the metadata stored in a named stream associated with the file identity "/test1/users/smith/file1.txt", a corresponding virtual file identity may be "/test1/users/smith/$cas:meta:file1.txt", where "meta" is defined as a cmd field value that selects all metadata associated with the file. Numerous other types of cmd field values are possible and contemplated, dependent upon the file system content defined by file system 205. For example, "wrdata" may cause file data to be written to the file, "md5x" may select the latest MD5 signature corresponding to the file, "pid" may return the process ID of the last process to generate a record corresponding to the file, "csiz" may return the last stored compressed size of the file, and so forth. It is also contemplated that the command token may be any suitable string and may be inserted at any desired point in the file identity in forming the virtual file identity.

It is possible in some embodiments that a given virtual file identity formed by embedding a command token within a given file identity may collide with another existing file identity within file system 205. Referring to the previous example, there may actually exist within file system 205 a file identity identical to the virtual file identity "/test1/users/smith/$cas:meta:file1.txt". This ambiguity may be resolved by convention, where the various applications interacting with file system 205 avoid using the various possible command tokens within the file identity when a virtual file identity is not intended. Also, file system 205 may be configured to treat command tokens as reserved, such that only virtual file identities may include them.

In an alternative format, a virtual file identity may be formed by prepending a virtual directory to the path of the given file specified in the given file's file identity. In one embodiment, the virtual directory may specify a top-level directory that is not visible to conventional path-listing functions of file system 205; that is, if a user or application were to attempt to perform a directory listing of a virtual directory, the virtual directory would not appear to exist, and a corresponding error or warning might be generated. Referring again to the previous example, one example of forming a virtual file identity by prepending a virtual directory is "/cas/test1/users/smith/file1.txt", where the virtual directory is "/cas". For such a virtual file identity, in one embodiment all metadata associated with the file identity, for example all metadata stored within corresponding named stream 320, may be returned. In an alternative embodiment, a number of virtual directories of the format "/cas/cmd" may be employed, where the cmd field indicates one or more of several possible types of metadata to be accessed as described above. If in such an embodiment only the MD5 signature corresponding to the file identity were desired, for example, the corresponding virtual file identity may be formed as "/cas/md5x/test1/users/smith/file1.txt". Numerous other types of virtual directory specifications and cmd field values are possible and contemplated, as noted above.

It is noted that in embodiments where virtual directories are used to form virtual file identities, if the top-level directory or "mount point" specified in the virtual directory is unique to the virtual space (i.e., the mount point is not used to refer to any physical directory structure within file system 205), then any virtual file identity formed using that virtual directory may be guaranteed to be unique. Collisions between virtual file identities and existing file identities may thereby be avoided.

In addition to forming virtual file identities using command tokens and virtual directories, other formats for forming virtual file identities may be possible. In some embodiments, interface 305 may be configured to recognize only one format of virtual file identity, while in other embodiments interface 305 may recognize any of a number of such formats. Regardless of the virtual file identity format used, in one embodiment interface 305 may be configured to examine or monitor the various file operations received by filter driver 221 to determine whether such operations specify virtual file identities. If interface 305 detects a virtual file identity corresponding to a given file identity, it may be configured to select file system content indicated by the virtual file identity, and subsequently to return the selected content to the application or process issuing the file operation. For example, file system 205 may receive from a process 212 a file operation specifying a virtual file identity corresponding to a given file 310 that indicates that all or some portion of metadata should be returned. Upon detecting such a virtual file identity, interface 305 may be configured to directly or indirectly access corresponding named stream 320 and to select all or part of the metadata stored therein, dependent on the virtual file identity. (For example, the virtual file identity may specify only a particular subset of metadata, as described above.) The selected metadata may then be returned to process 212, which may correspond to a user application, for example.

Generally speaking, file identity formats are determined by a file system such as file system 205. Consequently, a given file identity is consistent regardless of the type of process or application accessing it or the programming language of that process or application. Since a virtual file identity is used to specify access to metadata in a manner similar to ordinary access to files by file identity as described above, interface 305 may operate to provide access to such metadata independently of the programming language of the requesting application.

In one embodiment, if interface 305 detects a virtual file identity specified by a given file operation, the operation may be processed according to the indication of the virtual file identity regardless of the type of file operation specified. That is, the specification of a virtual file identity in a file operation by an application or process may override other behavior specified by the file operation. For example, in one embodiment applications may be only allowed read access to metadata via a virtual file identity. In such an embodiment, if a given application issued a file write operation specifying a virtual file identity indicating that metadata were to be accessed, the write behavior may be disregarded by interface 305, and metadata may be read and returned as indicated by the virtual file identity. In other embodiments, attempts to access read-only metadata using a file write operation may be disallowed, and an error condition may or may not occur.

Thus, in some embodiments conventional file read and write operations may be "overloaded" via the function of interface 305 to perform different types of access to file data and metadata, as indicated by a particular virtual file identity. Similarly, it is noted that because in one embodiment interface 305 allows programming-language-independent access to any file system content, in some embodiments a given application need not implement specific individual system calls for file read and write operations. Rather, in such embodiments, a generic system call may be implemented that allows an application to pass a virtual file identity to file system 205. Interface 305 may then process the virtual file identity to determine the type of file system content to be returned.

Figure 4:
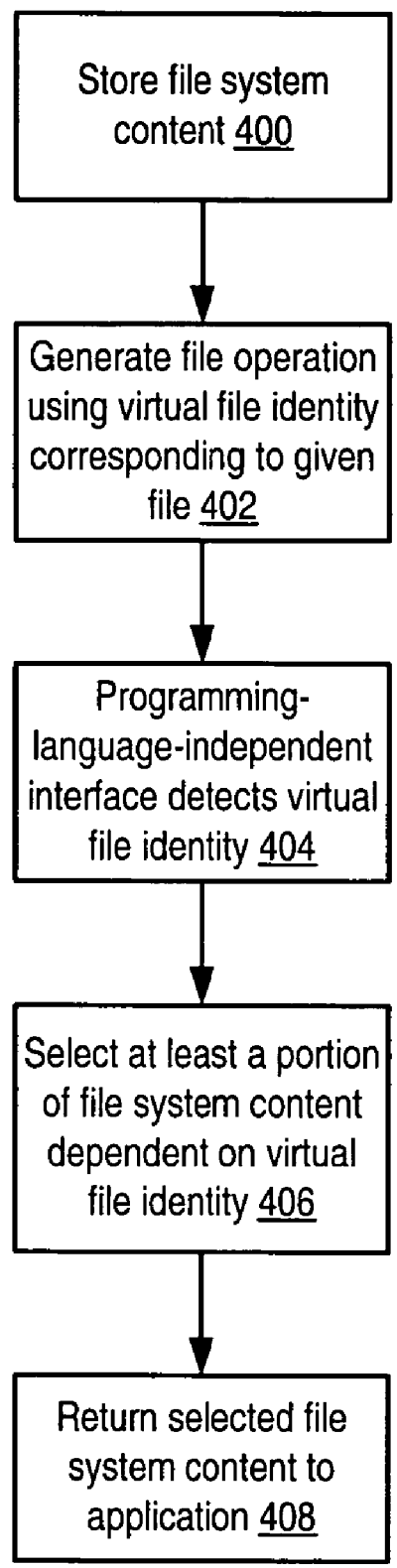
FIG. 4 is a flow diagram illustrating one embodiment of a method of accessing file system content via a programming-language-independent interface.

FIG. 4 illustrates one embodiment of a method of accessing file system content via a programming-language-independent interface. Referring collectively to FIG. 1 through FIG. 4, operation begins in block 400 where file system content, such as file data or metadata corresponding to a given file, is stored. For example, in one embodiment filter driver 221 may be configured to store metadata in a named stream 320 corresponding to a given file 310 subsequent to detecting a particular file operation on given file 310.

Subsequently, a given application or process may generate a file operation using a virtual file identity corresponding to the given file (block 402). In one embodiment, the virtual file identity may be formed by embedding a command token within the file identity corresponding to the given file, as described above. In another embodiment, the virtual file identity may be formed by prepending a virtual directory to the file identity corresponding to the given file, also as described above.

The virtual file identity may then be detected by a programming-language-independent interface (block 404). For example, in one embodiment, after a given process 212 generates the file operation specifying a given virtual file identity, the operation may be received by file system 205 via API 214. Filter driver 221 may process the file operation, and interface 305 may detect the virtual file identity.

Subsequent to detection of the virtual file identity, at least a portion of the file system content may be selected dependent on the virtual file identity (block 406). For example, in one instance the virtual file identity may specify that all or only a particular subset of metadata corresponding to a given file is desired, such as by specifying a particular command token or virtual directory. In another instance, file data included the given file may be selected.

After the appropriate file system content is selected, it may be returned to the application or process that requested it via the file operation (block 408). For example, in one embodiment interface 305 may place selected file data or metadata in a buffer and return a pointer to the buffer to given process 212 via file system 205 and API 214. Other methods by which return of the selected metadata may be coordinated are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a storage device configured to store a plurality of files; and
   a host device comprising a processor, wherein the processor is configured to execute instructions configured to implement a file system, wherein the file system is configured to manage access to said storage device and to store file system content on said storage device, wherein said file system comprises a programming-language-independent interface through which an application is configured to access said file system content, wherein said programming-language-independent interface is further configured to receive a request to access said file system content from said application without dependence on a programming language in which said application is implemented;
   wherein said programming-language independent interface is further configured to:
      detect a virtual file identity corresponding to a given file, wherein said virtual file identity includes a given file identity that specifies said given file within said file system and further includes additional information that specifies particular file system content to be accessed with respect to said given file identity;
      select at least a portion of said particular file system content dependent on said virtual file identity; and
      return said selected file system content.

2. The system as recited in claim 1, wherein said file system content comprises file data stored in one or more of said plurality of files.

3. The system as recited in claim 1, wherein said file system content comprises metadata stored in a named stream corresponding to a given file.

4. The system as recited in claim 1, wherein said metadata is stored in Extensible Markup Language (XML) format.

5. The system as recited in claim 1, wherein said virtual file identity is formed by embedding a command token within said given file identity corresponding to said given file.

6. The system as recited in claim 1, wherein said virtual file identity is formed by prepending a virtual directory to said given file identity corresponding to said given file.

7. A method, comprising:
   a file system storing file system content on a storage device configured to store a plurality of files, wherein said file system is implemented by a host device; and
   an application accessing said file system content via a programming-language-independent interface implemented by said file system without dependence on a programming language in which said application is implemented;
   said programming-language independent interface detecting a virtual file identity corresponding to a given file, wherein said virtual file identity includes a given file identity that specifies said given file within said file system and further includes additional information that specifies particular file system content to be accessed with respect to said given file identity;
   said programming-language-independent interface selecting at least a portion of said particular file system content dependent on said virtual file identity; and
   said programming-language-independent interface returning said selected file system content.

8. The method as recited in claim 7, wherein said file system content comprises file data stored in one or more files.

9. The method as recited in claim 7, wherein said file system content comprises metadata stored in a named stream corresponding to a given file.

10. The method as recited in claim 7, wherein said metadata is stored in Extensible Markup Language (XML) format.

11. The method as recited in claim 7, wherein said virtual file identity is formed by embedding a command token within said given file identity corresponding to said given file.

12. The method as recited in claim 7, wherein said virtual file identity is formed by prepending a virtual directory to said given file identity corresponding to said given file.

13. A computer-accessible storage medium comprising program instructions, wherein the program instructions are executable by a processor to implement a file system configured to:
   store file system content on a storage device configured to store a plurality of files; and
   present a programming-language-independent interface to an application, wherein said application accesses said file system content via said programming-language-independent interface without dependence on a programming language in which said application is implemented;
   wherein said programming-language independent interface is further configured to:
      detect a virtual file identity corresponding to a given file, wherein said virtual file identity includes a given file identity that specifies said given file within said file system and further includes additional information that specifies particular file system content to be accessed with respect to said given file identity;

select at least a portion of said particular file system content dependent on said virtual file identity; and return said selected file system content.

14. The computer-accessible storage medium as recited in claim 13, wherein said file system content comprises file data stored in one or more files.

15. The computer-accessible storage medium as recited in claim 13, wherein said file system content comprises metadata stored in a named stream corresponding to a given file.

16. The computer-accessible storage medium as recited in claim 13, wherein said metadata is stored in Extensible Markup Language (XML) format.

17. The computer-accessible storage medium as recited in claim 13, wherein said virtual file identity is formed by embedding a command token within said given file identity corresponding to said given file.

18. The computer-accessible storage medium as recited in claim 13, wherein said virtual file identity is formed by prepending a virtual directory to said given file identity corresponding to said given file.

* * * * *